United States Patent [19]

Swozil et al.

[11] Patent Number: 5,211,220
[45] Date of Patent: May 18, 1993

[54] TUBE FOR A SHELL AND TUBE HEAT EXCHANGER AND PROCESS FOR THE MANUFACTURE THEREOF

[75] Inventors: Adolf Swozil, Kühlenthal; Gerhard Ullmann, Gross-Gerau, both of Fed. Rep. of Germany

[73] Assignee: Sigri Great Lakes Carbon GmbH, Meitingen, Fed. Rep. of Germany

[21] Appl. No.: 364,788

[22] Filed: Jun. 9, 1989

[30] Foreign Application Priority Data

Jun. 21, 1988 [DE] Fed. Rep. of Germany ....... 3820866

[51] Int. Cl.$^5$ .......................... F28F 21/02; F16L 9/14
[52] U.S. Cl. .................................. 165/133; 165/180; 165/905; 165/906; 138/141; 138/153
[58] Field of Search ....................... 165/133, 180, 905; 138/125, 141, 146, 153, 172

[56] References Cited

U.S. PATENT DOCUMENTS

| | | | |
|---|---|---|---|
| 2,783,173 | 2/1957 | Walker et al. | 138/145 |
| 2,807,282 | 2/1958 | Watts et al. | 138/76 |
| 3,002,534 | 10/1961 | Noland | 138/141 |
| 3,008,493 | 11/1961 | Roe | 138/146 |
| 3,080,893 | 3/1963 | Craycraft | 138/141 |
| 3,462,850 | 8/1969 | Galer | 165/133 |
| 3,481,369 | 12/1969 | Ganahl | 138/153 |
| 3,718,161 | 2/1973 | Woodson | 138/153 |
| 3,734,139 | 5/1973 | Zafiroglu | 138/141 |
| 4,193,180 | 3/1980 | Press | 165/133 |
| 4,238,260 | 12/1980 | Washkewicz | 138/153 |
| 4,258,755 | 3/1981 | Higbee | 138/153 |
| 4,469,138 | 9/1984 | Satoh | 138/174 |
| 4,474,233 | 10/1984 | Swozil | 138/141 |
| 4,496,621 | 1/1985 | Hubert et al. | 165/905 |
| 4,693,281 | 9/1987 | Creedon | 138/153 |
| 4,800,109 | 1/1989 | Washizu | 138/141 |

FOREIGN PATENT DOCUMENTS

| | | | |
|---|---|---|---|
| 0181614 | 5/1986 | European Pat. Off. | 165/905 |
| 1049171 | 1/1959 | Fed. Rep. of Germany . | |
| 1231974 | 1/1967 | Fed. Rep. of Germany | 138/125 |
| 3116309 | 5/1985 | Fed. Rep. of Germany . | |
| 3054239 | 3/1988 | Japan | 138/172 |
| 3070096 | 3/1988 | Japan | 138/172 |
| 1107843 | 3/1968 | United Kingdom . | |

OTHER PUBLICATIONS

Publication explaining Diabon, date unknown.

Primary Examiner—John Rivell
Assistant Examiner—L. R. Leo
Attorney, Agent, or Firm—Herbert L. Lerner; Laurence A. Greenberg

[57] ABSTRACT

Better mechanical properties are achieved with tubes for shell and tube heat exchangers by providing a coating on the tubes which is formed of fibers and a fluorine-containing polymer covering the fibers. The tubes are formed of fluorine-containing polymers whose use in heat exchangers is normally limited by the comparatively small compressive strength and fatigue resistance of the tubes.

5 Claims, No Drawings

TUBE FOR A SHELL AND TUBE HEAT EXCHANGER AND PROCESS FOR THE MANUFACTURE THEREOF

The invention relates to a fluorine-containing polymer tube for use in a shell and tube heat exchanger and a process for the manufacture thereof.

Fluorine-containing polymers which are distinguished, inter alia, by comparatively high use temperatures, very good corrosion and solvent resistance and non-sticking properties, are suitable for use as internal coatings for chemical apparatus which are exposed to especially severe corrosive conditions. It is also known to manufacture shell and tube heat exchangers tubes or hollow filaments of fluorine-containing polymers, for example of polytetrafluoroethylene, polytrifluorochloroethylene, polyvinylidene fluoride, copolymers of vinylidene fluoride and hexafluoropropylene and of tetrafluoroethylene and hexafluoropropylene, as disclosed in British Patent No. 1 107 843. The disadvantages of fluorine-containing thermoplasts are their low compressive strength in the range of relatively high use temperatures and the comparatively limited fatigue resistance thereof, primarily limited by creep and fatigue. In part the deficiency can be eliminated by additions of fibrous or pulverous reinforcing materials, essentially burdening producibility and workability which are essentially made difficult by these additions. This applies in particular for thin-walled tubes intended for heat exchangers.

It is accordingly an object of the invention to provide a tube for a shell and tube heat exchanger and a process for the manufacture thereof, which overcome the hereinaforementioned disadvantages of the heretofore-known methods and devices of this general type.

With the foregoing and other objects in view there is provided, in accordance with the invention, a tube for a shell and tube heat exchanger, comprising a tube body formed of a fluorine-containing polymer, and a temperature and corrosion resistant layer covering said tube body, said layer being formed of fibers with a surface to which a fluorine-containing polymer covering has been applied. A plurality of tubes are used in a shell and tube heat exchanger.

More specifically, there is provided a tube for a shell and tube heat exchanger, comprising a PTFE tube body having an outside diameter of substantially 10 mm and wall thickness of substantially 1 mm, and a temperature and corrosion resistant layer wound cross-wise at an angle of approximately 60° on appproximately 60% of said tube body, said layer being formed of fibers of a carbon filament yarn with substantially 3000 lightly prestressed filaments and a surface to which a covering of an approximately 50% aqueous dispersion of PFA has been applied.

With the objects of the invention in view, there is also provided a process for the production of a tube for a shell and tube heat exchanger, which comprises coating fibrous material with a fluorine-containing polymer dispersion, covering a tube body with the coated fibers to form a temperature and corrosion- resistant layer on the tube body, and heating the tube body to a temperature sufficient for formation of intimate bonds between the fibers and the tube body.

More specifically, there is provided a process for the production of a tube for a shell and tube heat exchanger, which comprises coating fibers of a carbon filament yarn with substantially 3000 lightly prestressed filaments with an approximately 50% aqueous dispersion of PFA, winding the coated yarn cross-wise at an angle of approximately 60° on approximately 60% of a PTFE tube body with an outside diameter of substantially 10 mm and wall thickness of substantially 1 mm to form a temperature and corrosion-resistant layer on the tube body, heating the tube body to approximately 380° C. to evaporate the enclosed phase and melt the PFA, and cooling the covered tube body to form a firm connection between the tube body and the reinforcing fibers. The concept underlying the invention is to improve tubes used in shell and tube heat exchangers in a mechanical manner, by covering the tubes with a fiber layer, since the tubes themselves are formed of fluorine-containing thermoplasts which cannot be reinforced by incorporation of fibers in practice, due to the very difficult processing which would then be required. The coating covers each tube wall completely and restricts radial expansion of the tube upon heating thereof. The expansion is significantly greater for all fluorine-containing polymers than the expansion of the reinforcing fibers forming the fiber layer As a consequence, compressive stresses build up in the tubes which cause an increase of the compressive strength at higher temperatures and a reduction of creep in the radial direction. The fatigue resistance of the tubes covered by the fiber layer increases correspondingly. If the fibers are oriented, e.g. in the axial direction, the same effect can also be achieved for tubes stressed lengthwise. However, it is only possible to provide an effect which lasts for a longer period of time if the fibers forming the fiber layer are coated with a fluorine-containing polymer. The reinforcing layer is therefore formed of fibers and a fluorine-containing polymer. Fibers without a coating fail after a comparatively short time, primarily as a result of notch breaks. Coatings of fibers with other materials are not suitable due to insufficient temperature and corrosion resistance.

Coverings of carbon and graphite tubes, which are also used, inter alia, in shell and tube heat exchangers, with fabrics, e.g. glass fiber fabrics and carbon fiber yarns, are known from German Published, Prosecuted Application DE-AS 1 049 171, corresponding to U.S. Pat. No. 2,807,282 and German Patent DE 31 16 309 C2, corresponding to U.S. Pat. No. 4,474,233. Carbon and graphite tubes have an excellent fatigue strength, but are comparatively brittle and sensitive to impact. The covering of the reinforcing fibers therefore primarily serves the purpose of reducing the disadvantages of brittle body behavior. Since the coefficients of thermal expansion of graphite tubes and reinforcing fibers are not essentially different, it is necessary to form-lockingly connect tube and fibers with one another in order to achieve the desired effect. A form-locking connection is one which connects two elements together due to the shape of the elements themselves, as opposed to a force-locking connection, which locks the elements together by force external to the elements. One of ordinary skill in the art cannot learn from these disclosures that the properties of the tubes are improved by covering the tubes of thermoplastic fluorine-containing polymers with a fiber-containing layer and that indeed, in particular, the fatigue strength of tubes used in shell and tube heat exchangers is improved.

The fiber content of the layer covering the tubes is formed of fibers with a temperature resistance that is at least as large as that of the tubes and which are to a large extent resistant to corrosive substances. Most suitable are ceramic fibers, glass fibers or aramide fibers and above all carbon fibers which are characterized by especially great rigidity. Although the fibers are coated with a fluorine-containing polymer and in general are not in contact with corrosive media, the use of corrosion resistant fibers is necessary since the coating as a rule not is completely impermeable and relatively small amounts of the medium penetrate the coating. Basically all fluorine-containing polymers which can be brought into the fluid state as a melt, solution or dispersion are suitable as a coating material. Preferably, the coating is formed of polymers of the group perfluorinated alkoxypolytetrafluoroethylene (PFA), polyvinylethertetrafluoroethylene copolymer (TFA), tetrafluoroethylenehexafluoropropylene copolymer (FEP), which protect the fibers effectively at relatively high temperatures.

The tubes are formed preferably of polytetrafluoroethylene (PTFE) or a tetrafluoroethylene-containing copolymer which likewise has a good temperature resistance. The diameter of the tubes amounts preferably to 5 to 20 mm, the wall thickness to about 0.5 to 2 mm. The layer covering the tubes formed of coated fibers is wrapped around or drawn onto the tubes. In the first case, yarns are used for the production of the layer, in the second case, fabric sleeves with a diameter which corresponds approximately to the tube diameter are used. If extendable stocking-like structures are used, care should to be taken to ensure that the fibers and the tube are force lockingly connected with one another, for example by the coating material of the fibers. Such an intimate connection is also advantageous if fabrics with a larger mesh width are used. Larger meshes only insignificantly change the heat transfer coefficients of the uncoated tubes and are therefore preferred. At high temperatures and long loading times, the tube wall can bulge between the meshes when there is a large mesh spacing, especially with an undefined force flux. A force locking connection between fibers and tubes reduces the effect. The same holds for wound-on coverings which preferably form a network surrounding the tube. Fiber strips may alternate with strips of an uncovered tube surface with the permissible separation and degree of covering depending on the type and loading properties of the tubes, which is preferably experimentally determined. At the limiting region of higher stressing, it can be necessary to cover the tubes with an essentially closed layer, even at the cost of the specific heat transfer capacity.

Tubes of polytetrafluoroethylene (PTFE), which are exposed to especially large thermal and corrosive stressing in shell and tube heat exchangers, are preferably wrapped with a layer of carbon fibers which are provided with a coating containing perfluorinated alkoxypolytetrafluoroethylene (TFA) formed by application of a dispersion thereof. The covered tubes are heated to between 300° and 390° C. and then the enclosed phase of the dispersion is evaporated and solid bridges are formed of TFA between the PTFE tube and the carbon fibers. According to the process, coated tubes characterize themselves by especially satisfactory fatigue limits under severe loading conditions. The essential improvement in compressive strength and fatigue resistance permits the use of tubes with a comparatively large diameter and small wall thickness so that the heat transfer capacity is comparable to and not smaller than known tubes and in general is greater.

Other features which are considered as characteristic for the invention are set forth in the appended claims.

Although the invention is described herein as embodied in a tube for a shell and tube heat exchanger and a process for the manufacture thereof, it is nevertheless not intended to be limited to the details given, since various modifications and structural changes may be made therein without departing from the spirit of the invention and within the scope and range of equivalents of the claims.

The construction and method of operation of the invention, however, together with additional objects and advantages thereof will be best understood from the following specific example which illustrates the invention when read in connection with the foregoing description.

EXAMPLE

A carbon filament yarn with 3000 filaments which had been lightly prestressed was applied to PTFE tubes with an outside diameter of 10 mm and wall thickness of 1 mm in a cross-wise winding. The inclination of the wrapping relative to the tube axis amounted to 60° and the degree of covering amounted to about 60%. The carbon fibers were coated with a 50% aqueous dispersion of PFA. As a result of heating the wrapped tubes to 380° C., the enclosed phase was evaporated, the PFA was melted and a firm connection between tube and the reinforcing fibers was formed upon cooling the tubes.

The bursting pressure of coated and, for comparison, uncoated PTFE tubes was determined at a temperature of 155° C. as follows:
Example —53 bar
Comparison—12 bar.

The foregoing is a description corresponding in substance to German Application P 38 20 866.0, dated Jun. 21, 1988, the International priority of which is being claimed for the instant application, and which is hereby made part of this application. Any material discrepancies between the foregoing specification and the aforementioned corresponding German application are to be resolved in favor of the latter.

We claim:

1. Tube for a shell and tube heat exchanger, comprising a PTFE tube body having an outside diameter of substantially 10 mm and wall thickness of substantially 1 mm, and a temperature and corrosion resistant layer would cross-wise at an angle of approximately 60° on approximately 60% of said tube body, said layer being formed of fibers of a carbon filament yarn with substantially 3000 lightly prestressed filaments and a surface to which a covering of an approximately 50% aqueous dispersion of PFA has been applied.

2. Process for the production of a tube for a shell and tube heat exchanger, which comprises coating carbon fibers with a perfluorinated alkoxypolytetrafluoroethylene dispersion, covering a polytetrafluoroethylene tube body with the coated carbon fibers to form a temperature and corrosion-resistant layer on the tube body, and heating the tube body to between 300° and 390° C. to effect formation of intimate bonds between the carbon fibers and the tube body.

3. Process according to claim 2, which comprises winding the coated fibers onto the tube body during the covering step.

4. Process according to claim 2, which comprises applying the fibers to the tube body in the form of a preformed sleeve during the covering step.

5. Process for the production of a tube for a shell and tube heat exchanger, which comprises coating fibers of a carbon filament yarn with substantially 3000 lightly prestressed filaments with a approximately 50% aqueous dispersion of PFA, winding the coated yarn crosswise at an angle of approximately 60° on approximately 60% of a PTFE tube body with an outside diameter of substantially 10 mm and wall thickness of substantially 1 mm to form a temperature and corrosion-resistant layer on the tube body, heating the tube body to approximately 380° C. to evaporate the enclosed phase and melt the PFA, and cooling the covered tube body to form a firm connection between the tube body and the reinforcing fibers.

* * * * *